UNITED STATES PATENT OFFICE.

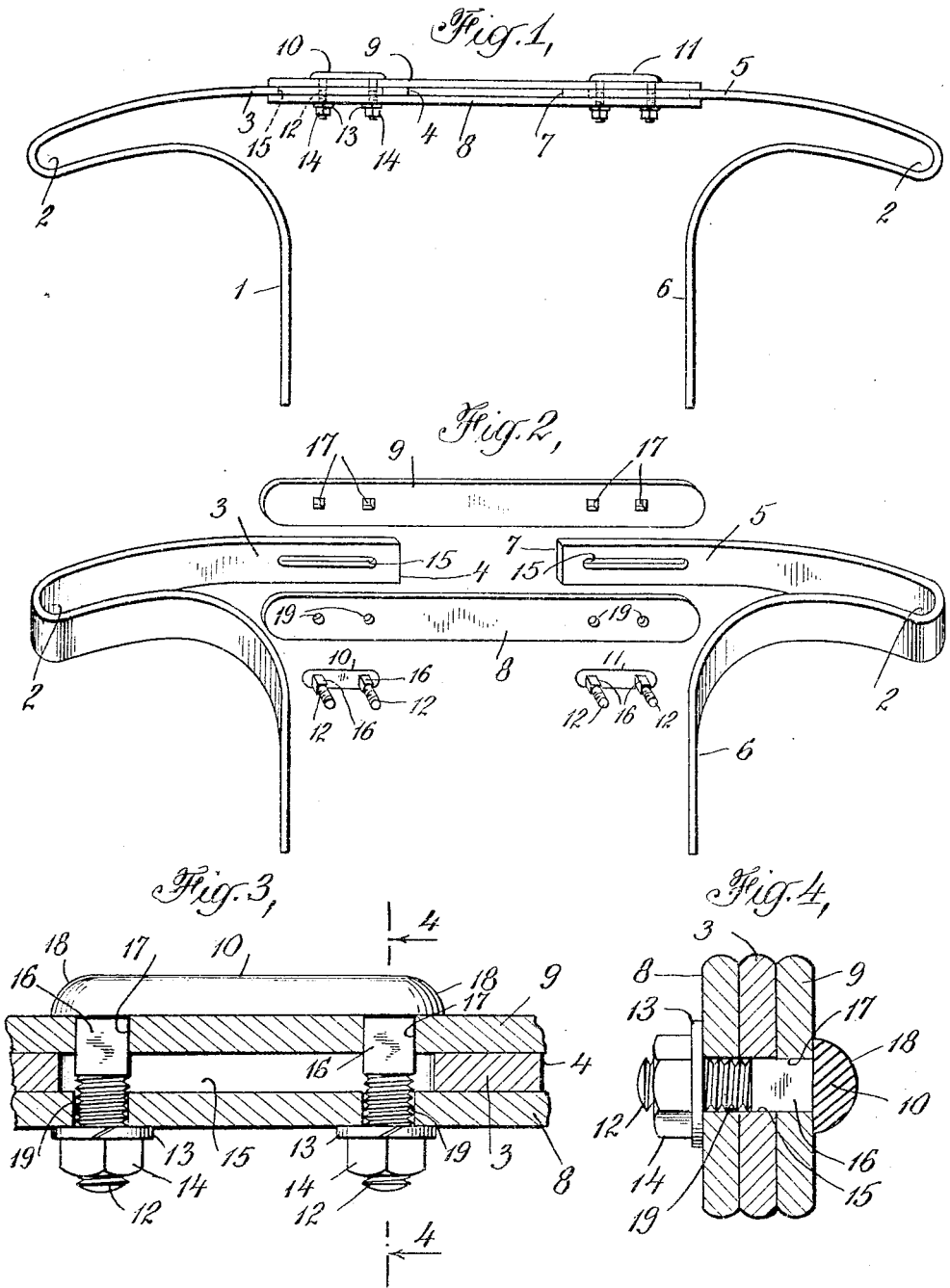

GEORGE ALBERT LYON, OF PHILADELPHIA, PENNSYLVANIA.

ADJUSTABLE AUTOMOBILE-BUFFER.

1,386,190.         Specification of Letters Patent.         Patented Aug. 2, 1921.

Application filed December 27, 1919, Serial No. 347,760. Renewed June 18, 1921. Serial No. 478,718.

*To all whom it may concern:*

Be it known that I, GEORGE ALBERT LYON, a citizen of the United States, residing at Philadelphia, county of Philadelphia, State of Pennsylvania, have made a certain new and useful Invention Relating to Adjustable Automobile-Buffers, of which the following is a specification, taken in connection with the drawing accompanying the same.

This invention relates to resilient front automobile buffers preferably formed of or comprising spring steel strip and having the front or impact receiving portions reinforced by or more or less composed of spring steel reinforcing members having such connection with the connecting portions or parts of the buffer as to have a desirable alining action thereon. The attaching members of the buffer which are adapted to be clamped or otherwise secured to the frame of the automobile or other vehicle may be formed with end loops or curved resilient portions and may extend inward more or less toward each other to form impact receiving members and the spring steel reinforcing strips or members which are preferably arranged on the front or back of these impact receiving members throughout their central portions at least, may advantageously be bolted to the connecting portions of these other buffer members by the use of U-bolt connecting devices so as to form a substantially vertically rigid connection therewith and constitute a desirable reinforcement therefor in some cases. In case such front reinforcing members are used both in front of and behind the impact receiving members which they connect duplicate connecting holes may be formed at each end of the reinforcing members through which may extend U-bolt connecting devices which preferably though not necessarily are provided with square shanks extending through one set of these duplicate holes and through coöperating adjusting and alining slots which may advantageously be formed in one or both of the impact receiving members where lateral adjustment is desired. The bolt shanks may thus hold the connected parts in substantial vertical alinement after they have been bolted together and thus insure a strong and substantially rigid connection when the buffer has been connected to an automobile or other vehicle.

In the accompanying drawing showing in a somewhat diagrammatic way an illustrative embodiment of this invention, Figure 1 is a top view of an illustrative form of buffer.

Fig. 2 is a diagrammatic perspective view showing the different parts in separated position.

Fig. 3 is an enlarged vertical section taken through one of the U-bolt connecting devices; and Fig. 4 is a corresponding transverse section taken substantially along the line 4—4 of Fig. 3.

The buffer may as shown in Figs. 1 and 2 be composed of a number of strips of resilient material such as tempered spring steel and it is desirable to have these strips at least throughout such portions as are subject to considerable vertical bending forces given a considerably greater vertical width than thickness so as to render them vertically rigid while resiliently yielding to a much greater extent in horizontal directions for the purpose of absorbing collision impacts. Two such spring strips are shown as having practically similar contour and comprising attaching members 1, 6 of any suitable shape and construction to be connected to the automobile frame or other part of the vehicle. These strips may as indicated comprise curved resilient portions, such, for example, as the open end loops 2 which are adapted to extend outward into protective position adjacent the automobile wheels and give greater resilience to the connected impact receiving members 3, 5, which extend toward each other adjacent the center of the buffer, so that they are preferably arranged substantially in line with each other at their adjacent ends.

For the purpose of rigidly and securely connecting such impact receiving members and preferably making them relatively adjustable to adjust the width of the automobile buffer, one or more reinforcing connecting members preferably of a resilient character may be bolted on either or both sides of these coöperating inner ends or connecting portions of the impact receiving members. Such reinforcing members may be advantageously formed of spring steel strip and may extend any desired distance on either or both sides of the impact receiving members so as to simultaneously connect the same and form a multiple thickness reinforced front portion of the buffer which may advantageously extend at least throughout about the distance between the attaching members or the automobile frame members to which they are connected. As is indicated in the drawing the resilient reinforcing member 9 which may be of spring steel strip may be securely connected or bolted to the front side of the impact receiving members by suitable U-bolt connecting devices 10, 11, preferably having square or polygonal shank portions 16 which may extend through the correspondingly shaped duplicate connecting holes 17 in this front reinforcing member. The connecting bolts may extend through suitable adjusting or other connecting openings in the impact receiving members preferably so arranged as to allow their lateral adjustment, and for example, these connecting bolts may extend through the adjusting alining slots 15 in these impact receiving members of the other buffer strips and fit sufficiently tightly therein to have a desirable vertical alining action in connection therewith, as is indicated in Fig. 4. If desired, another reinforcing member or strip 8 may be used behind the impact receiving members and provided with duplicate connecting holes 19 through which the threaded ends 12 of the connecting bolts may pass before the parts are bolted together by the nuts 14 and interposed lock washers 13 which may be used, if desired, as indicated in Figs. 3 and 4.

U-bolt connecting devices of this type may be advantageously formed with a heavy substantially rigid yoke 10 which may have a flat rear surface to closely engage the coöperating member, and to give a more pleasing appearance this yoke or bar may be given a curved outer surface and ends 18 which may advantageously be nickel plated or otherwise finished so as to properly coöperate with the adjacent front reinforcing members, such as 9, which may also be nickel plated in some cases and have rounded ends as indicated. By using a single set of duplicate connecting holes at each end of the reinforcing connecting members these holes and adjacent portions are entirely concealed by the more or less ornamental yoke of the U-bolt connector while at the same time ample adjustment may be secured by the use of the adjusting slots or openings on the coöperating impact receiving members which may be entirely concealed by the overlapping ends of these reinforcing members. Furthermore, when as is desirable the U-bolt connectors are formed with square or polygonal shanks, such as 16, ample area of contact is secured between these shanks and the sides of the adjusting alining slots 15 in the impact receiving members so that these U-bolt shanks which may be rigidly supported by the adjacent connecting holes 17 in the front reinforcing member may engage each of the impact receiving members at two separated points so that they can substantially prevent any undesirable vertical movement between these parts even aside from the heavy clamping pressure which may be exerted between their coöperating surfaces when these U-bolt connecting devices are tightened. Such U-bolt connecting devices may be conveniently and effectively formed by any suitable methods such as drop forging which gives sufficient accuracy of fit for most purposes as well as facilitating the subsequent finishing operations.

This invention has been described in connection with a number of illustrative forms, proportions, parts, arrangements, materials, methods of connection and use, to the details of which disclosure the invention is not of course to be limited, since what is claimed as new and what is desired to be secured by Letters Patent is set forth in the appended claims:

1. The automobile buffer comprising resilient impact receiving front members of spring steel having considerably greater vertical width than thickness and having adjacent connecting portions formed with adjusting alining slots and having rearwardly extending attaching members adapted to be connected to an automobile frame and having interposed resilient end loop portions, and spring steel front reinforcing connecting members formed with duplicate connecting holes adjacent each end and arranged on both sides of said impact receiving members and U-bolt connectors having square shanks coöperating with said adjusting alining slots and secured within said connecting holes to adjustably and substantially rigidly connect said coöperating connecting portions of the buffer.

2. The automobile buffer comprising resilient impact receiving front members of spring steel having considerably greater vertical width than thickness and having adjacent connecting portions formed with adjusting alining slots and having rearwardly extending attaching members adapted to be connected to an automobile frame and having interposed resilient end loop portions, and front reinforcing connecting members formed with connecting holes adjacent each end and arranged beside said impact receiving members and U-bolt connectors having shanks coöperating with said adjusting alining slots and secured within said connecting holes to adjustably and substantially rigidly connect said coöperating connecting portions of the buffer.

3. The automobile buffer having attaching members and a connected buffer front comprising slotted spring strip connecting portions and coöperating spring strip front reinforcing connecting members extending throughout the central portion of the buffer front between said attaching members arranged on both sides of said slotted connecting portions and formed with duplicate connecting holes and U-bolt connecting devices comprising a yoke having a flat face coöperating with the adjacent reinforcing connecting member and having a rounded exposed portion and ends and comprising square shanks extending into the connecting holes of one of said reinforcing connecting members and into the slot in the coöperating inner connecting portion to have vertical alining action in connection therewith and adjustably connect such elements, the ends of said front reinforcing connecting members overlapping the slots in the coöperating connecting portions to conceal the same.

4. The automobile buffer having attaching members and a connected resilient buffer front comprising slotted spring strip connecting portions and coöperating front reinforcing connecting members extending throughout the central portion of the buffer front between said attaching members arranged on both sides of said slotted connecting portions and formed with connecting holes and U-bolt connecting devices comprising shanks extending into the connecting holes of one of said reinforcing connecting members and into the slot in the coöperating inner connecting portion to have vertical alining action in connection therewith and adjustably connect such elements, the ends of said front reinforcing connecting members overlapping the slots in the coöperating connecting portions to conceal the same.

5. The automobile buffer having attaching members and a connected resilient buffer front comprising slotted spring strip connecting portions and a coöperating front reinforcing connecting member arranged in front of said slotted connecting portions and formed with connecting holes and U-bolt connecting devices comprising shanks extending into the connecting holes of said reinforcing connecting member and into the slot in the coöperating inner connecting portion to have vertical alining action in connection therewith and adjustably connect such elements.

6. The automobile buffer having a resilient buffer front comprising a slotted spring strip connecting portion and a coöperating spring strip front reinforcing connecting member arranged on one side of said slotted connecting portion and formed with duplicate connecting holes and a U-bolt connecting device comprising a rounded front yoke having a flat face coöperating with said reinforcing connecting member and comprising square shanks extending into the connecting holes of one of said reinforcing connecting members and into the slot in said inner connecting portion to have vertical alining action in connection therewith, and adjustably connect such elements.

7. The automobile buffer having a resilient buffer front comprising an apertured spring strip connecting portion and a coöperating reinforcing connecting member arranged on one side of said connecting portion and formed with duplicate connecting holes and a U-bolt connecting device comprising a yoke having a flat face coöperating with said reinforcing connecting member and comprising shanks extending into the connecting holes of one of said reinforcing connecting members and into said inner connecting portions to adjustably connect such elements.

GEORGE ALBERT LYON.